United States Patent
Oh et al.

(10) Patent No.: US 10,215,058 B2
(45) Date of Patent: Feb. 26, 2019

(54) TURBINE POWER GENERATION SYSTEM HAVING EMERGENCY OPERATION MEANS, AND EMERGENCY OPERATION METHOD THEREFOR

(71) Applicant: POSCO ENERGY CO., LTD., Seoul (KR)

(72) Inventors: Sung Keun Oh, Incheon (KR); Jea Jun Lee, Seoul (KR); Ju Chang Lim, Incheon (KR); Sang Hoon Lee, Seoul (KR); Sang Myeong Lee, Seongnam-si (KR); Ki Tae Kim, Anyang-si (KR); Yong Sik Hah, Anyang-si (KR); Chul Kyu Kim, Anyang-si (KR)

(73) Assignee: POSCO ENERGY CO., LTD., Seoul (KR)

( * ) Notice: Subject to any disclaimer, the term of this patent is extended or adjusted under 35 U.S.C. 154(b) by 149 days.

(21) Appl. No.: 15/529,241

(22) PCT Filed: Aug. 28, 2015

(86) PCT No.: PCT/KR2015/009053
§ 371 (c)(1),
(2) Date: May 24, 2017

(87) PCT Pub. No.: WO2016/085096
PCT Pub. Date: Jun. 2, 2016

(65) Prior Publication Data
US 2017/0328240 A1    Nov. 16, 2017

(30) Foreign Application Priority Data

Nov. 24, 2014 (KR) .......................... 10-2014-0164126

(51) Int. Cl.
*F01K 13/02* (2006.01)
*F01D 15/10* (2006.01)
(Continued)

(52) U.S. Cl.
CPC .............. *F01K 13/02* (2013.01); *F01D 15/10* (2013.01); *F01D 17/08* (2013.01); *F01D 17/105* (2013.01);
(Continued)

(58) Field of Classification Search
CPC .......... F01D 15/10; F01K 21/00; F01K 13/02; F01K 11/02
See application file for complete search history.

(56) References Cited

U.S. PATENT DOCUMENTS 3,588,265 A * 6/1971 Berry ...................... F01D 19/02
415/1
3,643,437 A * 2/1972 Birnbaum ............... F01D 21/02
60/646
(Continued)

FOREIGN PATENT DOCUMENTS

JP       52-129803 A    10/1977
JP       54-135945 A    10/1979
(Continued)

OTHER PUBLICATIONS

Japanese Office Action dated Jun. 26, 2018.
European Search Report dated Nov. 15, 2018.

*Primary Examiner* — Mark A Laurenzi
*Assistant Examiner* — Shafiq Mian
(74) *Attorney, Agent, or Firm* — Rabin & Berdo, P.C.

(57) ABSTRACT

Discloses is a turbine power generation system having an emergency operation means and an emergency operation method therefor that are capable of controlling excess heat accumulated during emergency operation, and recycling the accumulated heat. A turbine power generation system includes: an inlet sensor part including a thermometer, a pressure gauge, and a flowmeter that are installed between the heater and the inlet valve and; an emergency discharge part including a branch pipe connected to the steam, and a heat control means installed on the branch pipe. Accordingly, the system and the method are capable of reducing a heat overload during an emergency operation by transferring a heat amount exchanged in the heat storage device to the heat consuming facility, minimizing thermal consumption (Continued)

by recycling the same, and preventing various problems caused by stopping an operation of the turbine power generation system.

8 Claims, 7 Drawing Sheets

(51) Int. Cl.
  *F01K 11/02* (2006.01)
  *F01D 17/08* (2006.01)
  *F01D 17/10* (2006.01)
  *F01D 21/00* (2006.01)
  *F02C 1/10* (2006.01)
  *F02C 6/18* (2006.01)
  *F02C 9/18* (2006.01)
  *F22B 37/42* (2006.01)

(52) U.S. Cl.
  CPC ............ *F01D 21/003* (2013.01); *F01K 11/02* (2013.01); *F02C 1/105* (2013.01); *F02C 6/18* (2013.01); *F02C 9/18* (2013.01); *F22B 37/42* (2013.01); *F05D 2220/60* (2013.01); *F05D 2220/72* (2013.01); *F05D 2270/09* (2013.01); *F05D 2270/301* (2013.01); *F05D 2270/303* (2013.01); *F05D 2270/3061* (2013.01)

(56) References Cited

U.S. PATENT DOCUMENTS

| | | | | |
|---|---|---|---|---|
| 4,178,762 A | * | 12/1979 | Binstock | F01D 17/18 60/660 |
| 4,333,310 A | * | 6/1982 | Uram | F01K 23/105 60/39.182 |
| 4,352,024 A | * | 9/1982 | Geary | F01K 25/14 290/2 |
| 4,679,399 A | | 7/1987 | Strickler | |
| 4,744,723 A | * | 5/1988 | Hashimoto | F01K 7/24 415/1 |
| 4,873,827 A | * | 10/1989 | Hadano | F01K 7/22 60/646 |
| 5,361,585 A | * | 11/1994 | Westphal | F01K 7/24 60/646 |
| 9,353,650 B2 | * | 5/2016 | Shindo | F01K 9/04 |
| 2003/0012639 A1 | * | 1/2003 | Seitz | F01D 17/085 415/1 |
| 2005/0022497 A1 | | 2/2005 | Takai et al. | |
| 2010/0326131 A1 | | 12/2010 | Lengert et al. | |
| 2013/0118168 A1 | * | 5/2013 | Ichiki | F01N 5/02 60/645 |
| 2017/0138215 A1 | * | 5/2017 | Kono | F01D 17/00 |

FOREIGN PATENT DOCUMENTS

| | | |
|---|---|---|
| JP | 57-059008 A | 4/1982 |
| JP | 57-173509 A | 10/1982 |
| JP | 58-023206 A | 2/1983 |
| JP | 60-187303 U | 12/1985 |
| JP | 62-063103 A | 3/1987 |
| JP | 06-123203 A | 5/1994 |
| JP | 08-319805 A | 12/1996 |
| JP | 2003-521623 A | 7/2003 |
| JP | 2008-008217 A | 1/2008 |
| KR | 10-0848285 B1 | 7/2008 |
| KR | 10-1090534 B1 | 12/2011 |
| KR | 10-1157294 B1 | 6/2012 |
| KR | 10-2012-0125383 A | 11/2012 |
| KR | 10-2013-0027441 A | 3/2013 |
| KR | 10-2014-0109124 A | 9/2014 |
| WO | WO 01/57366 A1 | 8/2001 |
| WO | WO 2008-090628 A1 | 7/2008 |

* cited by examiner

FIG. 1

(PRIOR ART)

FIG. 2

(PRIOR ART)

FIG. 3

(PRIOR ART)

FIG. 4

(PRIOR ART)

FIG. 5

(PRIOR ART)

FIG. 6

FIG. 7

TURBINE POWER GENERATION SYSTEM HAVING EMERGENCY OPERATION MEANS, AND EMERGENCY OPERATION METHOD THEREFOR

TECHNICAL FIELD

The present invention relates to a turbine power generation system having an emergency operation means and an emergency operation method therefor. More particularly, the present invention relates to a turbine power generation system having an emergency operation means and an emergency operation method therefor that are capable of controlling excess heat accumulated during emergency operation due to a device malfunction, and recycling the accumulated heat.

BACKGROUND ART

There are two main ways to control systems that generate power by rotating turbines by using vapour energy. The first one is a method of controlling an operating turbine by using a turbine velocity of the operating turbine, and by controlling active power and reactive power that are generated by the turbine.

The second one is a method of controlling systems used in case of a device malfunction detected due to an abnormality of a temperature and a pressure, and a flow rate of a working fluid at an inlet part of the turbine.

The first control method is generally performed by using a speed governor and a synchronizer. However, the second control method stays at a primitive stage of stopping a cycle by blocking a valve at the time of occurrence of the problem.

Of course, although data such as temperature, pressure, flow rate and vibration is measured in real time while the system is monitored to quickly respond to problems such as device malfunction, a quick post-countermeasure may be available by monitoring the system in real time, but a proactive countermeasure is difficult.

Figure 1:
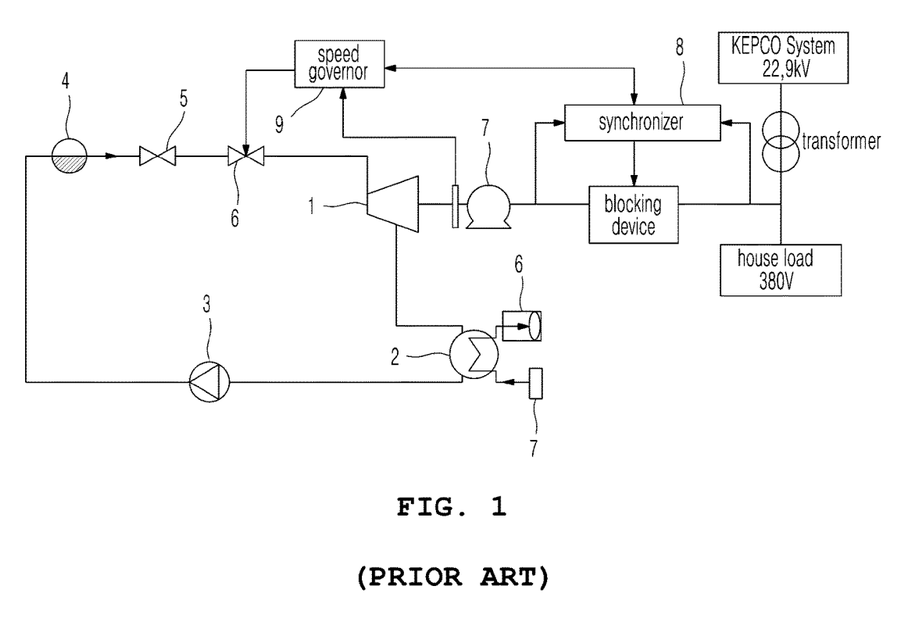
FIG. 1 is a configuration diagram of a turbine power generation system of a conventional technique.

FIG. 1 shows a configuration block of a conventional turbine power generation system.

Device malfunctions due to a temperature, pressure, flow rate, vibration, etc. of an inlet part of a turbine frequently occur due to malfunctions of the turbine that has the most complicated structure. Accordingly, the turbine has to be stopped to diagnose devices.

Referring to FIG. 1, when a device malfunction occurs, conventionally, first the turbine is stopped, and the stopping of the turbine leads to stopping of a boiler and the rest of the devices. However, when a turbine power generating system is re-operated after solving the device malfunction, various problems arise.

For example, condensate water may be generated in an inlet valve of the inlet part of the turbine or in a proportional control valve, thus a turbine blade may be damaged. In addition, non-productive time is spent, and power consumption to reheat the boiler is required.

Heating up to the boiler the normal operating temperature, consumes much energy, particularly as it gets closer to the normal operating temperature.

In addition, when wasted heat of an incineration plant is used for generating power, and a boiler should be stopped due to a device malfunction, an incinerator of the incineration plant itself should be also stopped.

Herein, a bypass pipe that is branched between a heater and a turbine may be installed to bypass a working fluid to a steam condenser so that only the turbine is stopped and other devices are operated.

However, when the bypass pipe is installed, and the working fluid flowing inside the heater that is heated by the boiler's heat by passing the bypass pipe directly flows to the steam condenser, the steam condenser may exceed its condensation volume, and thus malfunctions of the steam condenser and other devices sequentially connected to the steam condenser such as compression pump, etc. may occur.

Accordingly, a means for preventing problems caused by excess heat and recycling the excess heat while other devices except for the turbine being operating is required.

A conventional technique related thereto is described in detail in Korean Patent No. 10-1090534 (Registration date: Nov. 30, 2011) with the tile 'Automatic power control apparatus for power generator' that is shown in FIG. 2.

Figure 2:
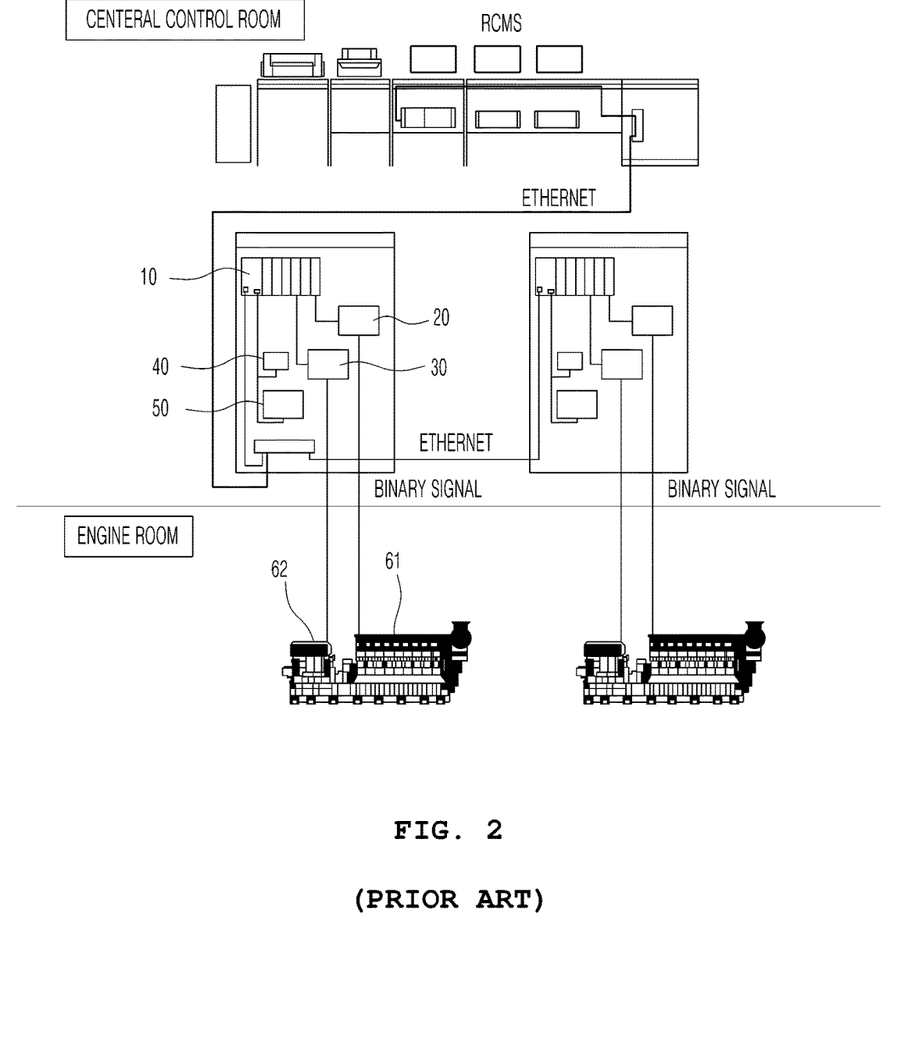
FIG. 2 is a configuration diagram showing an automated power control apparatus for a power generator of a conventional technique.

Referring to FIG. 2, the conventional technique discloses an automatic power control apparatus for a power generator that includes a power generator protecting relay 40, a governor 20, and an automatic voltage controller 30, and a PLC central controller 10. The PLC central controller 10 calculates a control value by using operation data received from the power generator protecting relay 40 and a predetermined reference value, and by performing proportional-integral-derivative (PID) operations. The automatic power control apparatus for the power generator further includes a PID logic control program module that controls the automatic voltage adjustor and the governor 20 according to the calculated control value.

According to the above conventional technique, malfunctions of the power generator may be prevented by using an integrated automated control technique rather than a conventional independent manual control technique. In addition, there is an effect of preventing a risk such as a sudden load on an engine. In addition, an engine power generator may be conveniently and safely monitored and controlled by remotely inputting outputs and power factors of respective power generators.

Figure 3:
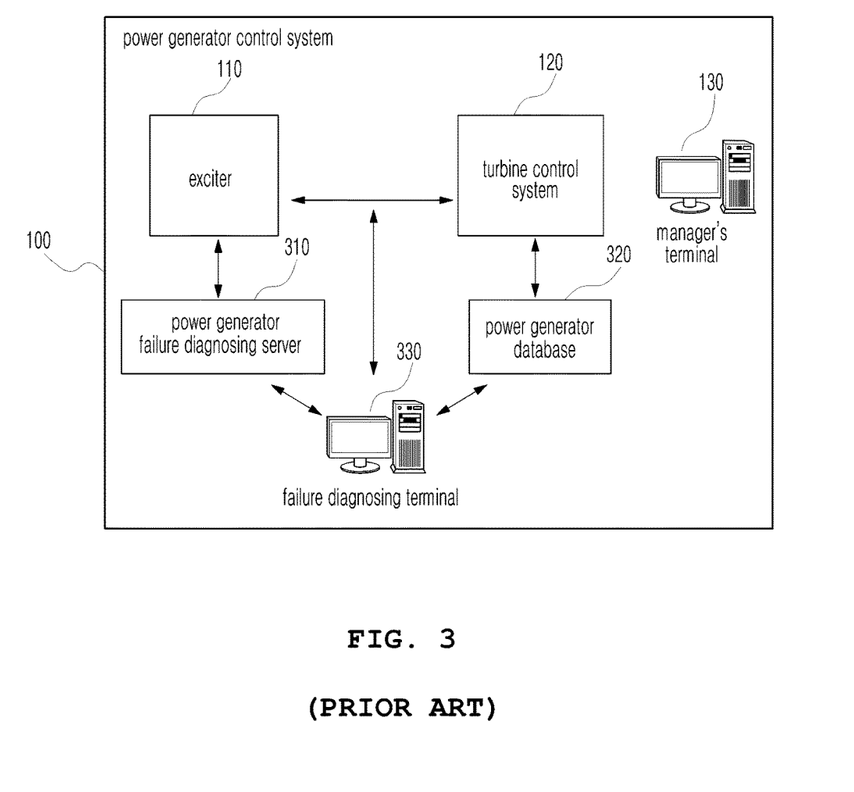
FIG. 3 is a configuration diagram showing a method of providing failure diagnosis and prediction maintenance of a control system of a generator, and an apparatus and a system therefor of a conventional technique.

As another conventional technique, Korean Patent No. 10-0848285 (Registration date: Jul. 25, 2008) with the tile 'Method of providing predictive maintenance with fault diagnostic for power generator control system, apparatus and system therefor' is shown in FIG. 3.

The above conventional technique discloses a method of providing a predictive maintenance with a fault diagnostic for a power generator control system, and an apparatus and a system therefor. In detail, the method of providing the predictive maintenance with the fault diagnostic for the power generator control system, the apparatus and the system therefor disclose that when a number of fail codes occurs between an exciter of a power generator control system and a turbine control system, a power generator failure diagnosing server detects the failure and stores each fail code in a database, extracts and outputs causes of the respective fail codes and maintenance methods therefor, checks whether or not there is a failure prediction part in the power generator, and outputs the failure prediction part when there is.

Figure 4:
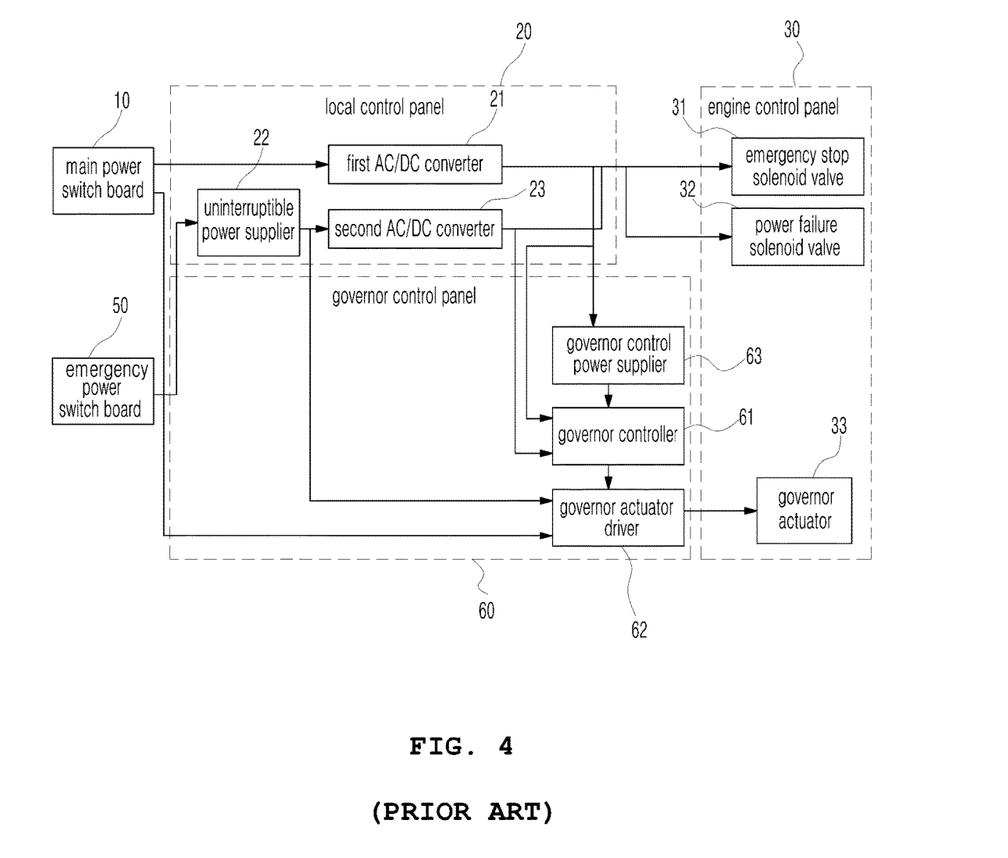
FIG. 4 is a configuration diagram showing an electronic governor control apparatus of a conventional technique.

As another conventional technique, Korean Patent Application Publication No. 10-2014-0109124 with the title 'Apparatus for controlling of electric governor in vessel' is shown in FIG. 4.

The above conventional technique discloses an apparatus for controlling of an electric governor in a vessel, which includes: a local control panel that supplies battery power as governor control power and engine control power through main power, emergency power, or an uninterruptible power supplier; and a governor control panel that controls an engine RPM by controlling a governor actuator of the engine control panel by using governor power supplied from the local control panel, and stops the governor actuator by using the governor control power that is temporally maintained when a failure of the governor power occurs.

Figure 5:
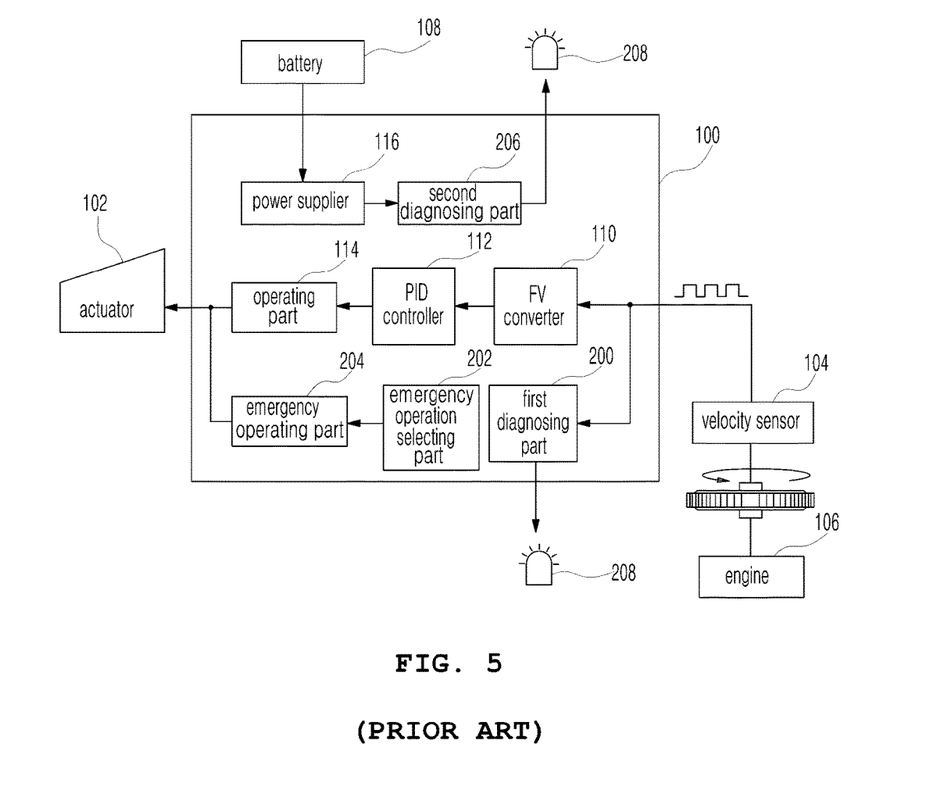
FIG. 5 is a configuration diagram showing an electric governor control apparatus of a conventional technique.

As another conventional technique, Korean Patent No. 10-1157294 (Registration date: Jun. 11, 2012) with the title 'Electric governor controller' is shown in FIG. 5.

In the above conventional technique, a governor controller includes an emergency operation means and controls an engine operation so that predetermined output power is generated in a situation where urgent power generation is required. Accordingly, it is possible to prevent accidents and inconveniences that may occur due to the inability to operate the engine despite the situation requiring urgent power generation. In addition, it is possible to diagnose when device malfunctions occur, and inform a user of the malfunctions. Thus the user can easily manage operational failures that may occur in the devices.

However, as described above, when the above conventional techniques are applied to turbine power generation systems, there is no means for solving a thermal load that is applied to a steam condenser when only operations of the turbine is stopped.

Documents of Related Art (Patent Document 1) Korean Patent No. 10-1090534 (Registration date: Nov. 30, 2011);
(Patent Document 2) Korean Patent No. 10-0848285 (Registration date: Jul. 25, 2008);
(Patent Document 3) Korean Patent Application Publication No. 10-2014-0109124 (Publication date: Sep. 15, 2014); and
(Patent Document 4) Korean Patent No. 10-1157294 (Registration date: Jun. 11, 2012).

DISCLOSURE

Technical Problem

Accordingly, the present invention has been made keeping in mind the above problems occurring in the prior art, and an object of the present invention is to provide a turbine power generation system having an emergency operation means and an emergency operation method therefor that include a heat control means capable of controlling and utilizing excessive heat accumulated in a system when a turbine is stopped due to a turbine malfunction.

Technical Solution

In order to accomplish the above object, the present invention provides a turbine power generation system having an emergency operation means, wherein the system includes: a steam turbine; a steam condenser; a compression pump; a heater; an inlet valve; and a proportional control valve which are sequentially connected to each other and form a closed loop, with a synchronizer and a speed governor which enable an amount of a working fluid that flows through the closed loop, to be controlled by the inlet valve and the proportional control valve according to a number of revolutions per hour of the steam turbine, the system including:

an inlet sensor part including a thermometer, a pressure gauge, and a flowmeter that are installed between the heater and the inlet valve and; an emergency discharge part including a branch pipe connected to the steam condenser by being branched from one point between the inlet sensor part and the inlet valve, and a heat control means installed on the branch pipe.

Herein, the heat control means may be configured with a heat storage valve, a heat storage device, and a discharge valve that are installed on the branch pipe sequentially from the one point.

Herein, preferably, the heat storage device may be configured with a heat exchanger, and a heat amount exchanged in the heat storage device mat be transferred to a heat consuming facility so that the heat may be recycled.

Meanwhile, preferably, the system may further include a controller receiving signals indicative of sensing results from the inlet sensor part in real time, and controlling the heat storage valve and the discharge valve, and issuing a control command to the synchronizer to control the inlet valve.

In addition, according to an emergency operation method of operating a turbine power generation system of the present invention, wherein the turbine power generation system includes: a steam turbine; a steam condenser; a compression pump; a heater; an inlet valve; and a proportional control valve which are sequentially connected to each other and form a closed loop, with a synchronizer; and a speed governor which enable an amount of a working fluid that flows through the closed loop, to be controlled by the inlet valve and the proportional control valve according to revolutions per hour of the steam turbine, and the system includes: an inlet sensor part including a thermometer, a pressure gauge, and a flowmeter that are installed between the heater and the inlet valve and; and an emergency discharge part including a branch pipe connected to the steam condenser by being branched from one point between the inlet sensor part and the inlet valve, and a heat control means installed in the branch pipe, the method includes:

a first step of checking temperature, pressure, and flow rate measurement values of the inlet sensor part of the system in real time; a second step of blocking the inlet valve and the proportional control valve until a device malfunction being removed, and bypassing the working fluid to the branch pipe when the measurement values exceed threshold values; and a third step of opening the inlet valve and the proportional control valve, and blocking the branch pipe when the device malfunction is removed.

Herein, the heat control means may be configured with a heat storage valve, a heat storage device, and a discharge valve that are installed on the branch pipe sequentially from the one point.

Herein, preferably, the heat storage device may be configured with a heat exchanger, and a heat amount exchanged in the heat storage device may be transferred to a heat consuming facility so that the heat may be recycled.

Meanwhile, preferably, the turbine power generation system may further include: a controller receiving signals indicative of sensing results from the inlet sensor part in real time, and controlling the heat storage valve and the discharge valve, and issuing a control command to the synchronizer to control the inlet valve.

Advantageous Effects

The present invention has the following effects.

First, the system operates without being stopped, except for the turbine, by using a branch pipe and a heat storage device when a turbine malfunction occurs.

Second, wasted heat that can be discharged may be recycled by configuring the heat storage device with a heat exchanger.

Third, excessive heat load on the steam condenser can be prevented by using the heat storage device.

Fourth, when the turbine malfunction occurs, the system operates without being stopped, except for the turbine, thus, time and expense required for reheating a boiler is completely eliminated, and integrity of a turbine blade is maintained by preventing an inflow of condensate water into the turbine.

Fifth, when a controller is provided, monitoring of the turbine power generation system, an emergency method thereof, and recovering to a normal state may be automatically performed. Thus, labor, cost, and time required for monitoring a power generator state can be significantly reduced.

BEST MODE

Specific structural and functional descriptions of embodiments of the present invention disclosed herein are only for illustrative purposes of the embodiments of the present invention. The present invention may be embodied in many different forms without departing from the spirit and significant characteristics of the present invention. Therefore, the embodiments of the present invention are disclosed only for illustrative purposes and should not be construed as limiting the present invention.

Hereinbelow, exemplary embodiments of the present invention will be described in detail with reference to the accompanying drawings.

Figure 6:
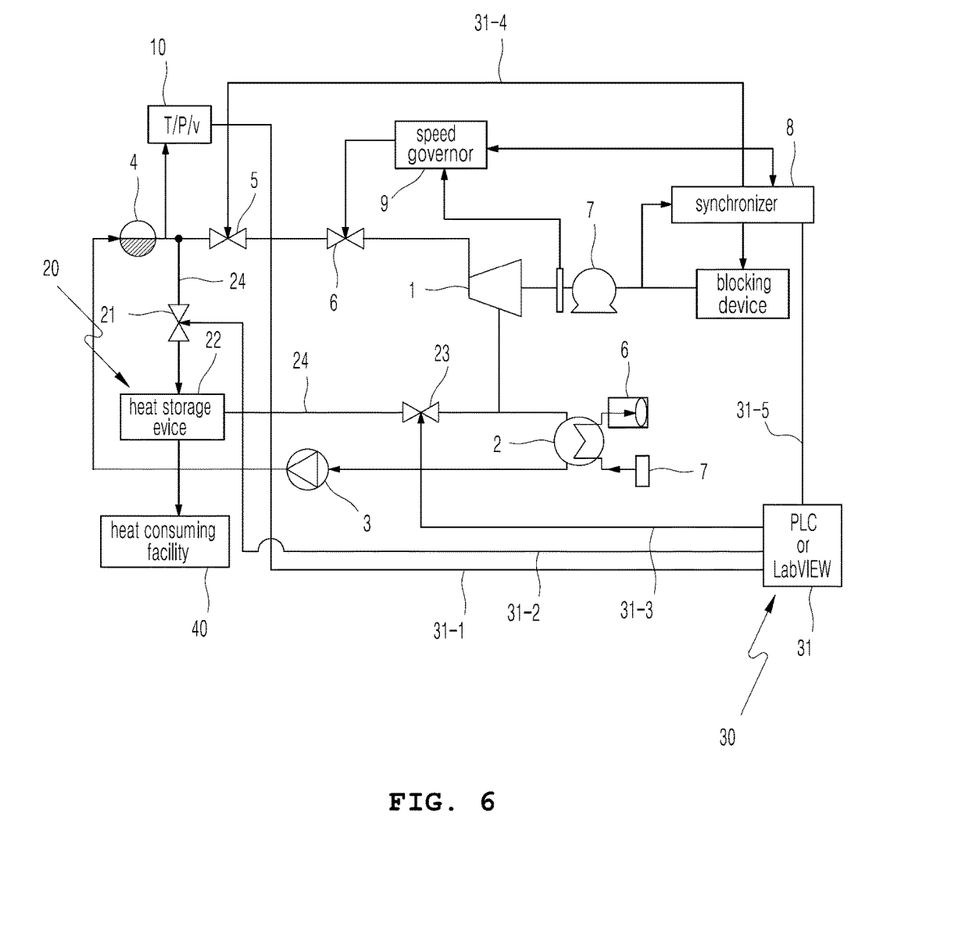
FIG. 6 is a configuration diagram showing a preferable embodiment of the present invention.
Figure 7:
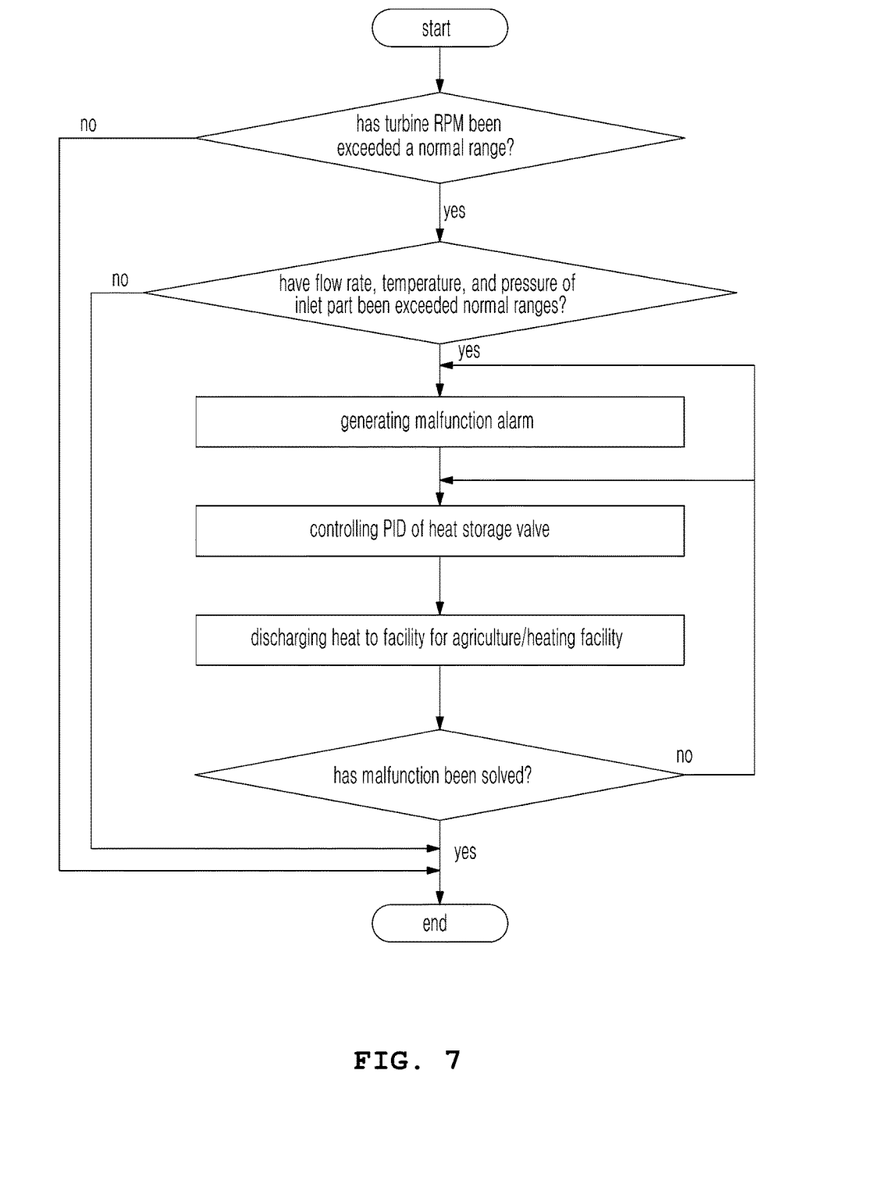
FIG. 7 is a block diagram showing an emergency operation method of a turbine power generation system of the present invention.

The present invention is shown in FIGS. 6 and 7, FIG. is a configuration diagram showing a configuration of a preferable embodiment of the present invention, and FIG. 7 is a view showing a flow diagram of an emergency operation method of a turbine power generation system according to the present invention.

First, a feature and a configuration of the present invention will be described in comparison with FIGS. 1 and 6. Then, interactions between characteristic components and other components of the present invention will be described in detail, and then, the emergency operation method of a turbine power generation system according to the present invention will be described.

Referring to a conventional technique shown in FIG. 1, the technique may be divided into a steam turbine cycle and turbine interlocking control equipment. The steam turbine cycle is configured in a single cycle by sequentially forming a turbine 1, a steam condenser 2, a compression pump 3, and a heater 4 on a working fluid pipe that forms a closed loop. Herein, an inlet valve 5 and a proportional control valve 6 are additionally installed between the heater 4 and the turbine 1 so that rotations of the turbine 1 and a power generator 7, and a flow rate of working fluid interlock with each other.

The turbine interlocking control equipment includes a speed governor 9, a synchronizer 8, and a blocking device. The speed governor 9 controls the proportional control valve 6 by receiving a signal indicative of a velocity that is measured between the turbine 1 and the power generator 7, and transceiver signals indicative of velocities with the synchronizer 8. The synchronizer 8 controls the power generator 7 by interlocking with the speed governor 9.

In the conventional technique, rotation control of the turbine 1 is controlled by the turbine interlocking control equipment described above, but when a device malfunction of the turbine or the power generator occurs, as the only countermeasure of a diagnosing method and a control thereof, the whole turbine power generation system has to be stopped to diagnose the malfunction and to repair the system.

However, in conclusion, in the present invention, the turbine power generation system may continue operating by using an inlet sensor part 10 and the emergency discharge part 20 shown in FIG. 6 even though a device malfunction occurs.

Referring to FIG. 6, the inlet sensor part 10 of the present invention is a sensor that is installed between the heater 4 and the turbine 1, in other words, on an inlet part of the turbine 1, and checks a pressure, a temperature, and a flow rate per unit time. In detail, the inlet sensor part 10 is installed between the heater 4 and the inlet valve 5 to check characteristics such as pressure and temperature of an inflow flow rate.

In addition, the emergency discharge part 20 of the present invention is configured with heat control means 21, 22, and 23 that are installed on one point between the inlet sensor part 10 and the inlet valve 5, on a branch pipe 24 connecting the steam condenser 2, and on the branch pipe 24. The heat control means 21, 22, and 23 are configured with a heat storage valve 21, a heat storage device 22, and a discharge valve 23 that are installed on the branch pipe 24 sequentially from the one point.

Accordingly, when turbine 1 or the power generator 7 is determined to be malfunctioning by using result values measure by the inlet sensor part 10, the inlet valve 5 is blocked so that a measuring fluid does not flow toward the turbine 1, and the heat storage valve 21 is opened so that a working fluid flows to the emergency discharge part 20.

Herein, preferably, when a malfunction of the power generator 7 or the turbine 1 occurs, flow of the fluid is automatically rather than manually controlled. For this, a controller 30 may be provided.

FIG. 6 shows a configuration of the controller 30. As shown in FIG. 6, the controller 30 receives signals measured by the inlet sensor part 10 in real time in analog signals through a signal transmission line 31-1 during a normal operation of the turbine power generation system. Herein, when values that are measured by the inlet sensor part 10 exceed threshold values, an alarm (not shown) is operated, and at the same time, a blocking signal for the inlet valve 5 is transmitted to the synchronizer 8 through a signal line 31-5, and the synchronizer 8 blocks an inlet valve 5 by transmitting the received signal to the inlet valve 5 through a signal line 31-4.

Herein, the controller 30 opens the heat storage valve 21 and the discharge valve 23 through signal lines 31-2 and 31-3.

Meanwhile, a heat storage device 22 is a kind of heat exchanger. Heat exchange within the heat storage device 22 is performed by exchanging heat with facilities that need heat. Accordingly, a heat storage fluid of a heat consuming facility 40 that needs heat flows into the heat storage device 22 to receive heat from the working fluid of the turbine power generation system. Thus, heat is supplied to the heat consuming facility 40 since the heat storage fluid is returned thereto.

The whole configuration of the present invention is described with an operational principle as above. Hereinbelow, effects between respective components will be described in detail. The emergency operation method of the turbine power generation system of the present invention will be described.

Referring again to FIG. 6, when measured values of the inlet sensor part 10 exceed threshold values due to a device malfunction of the turbine 1 or the power generator 7, an alarm is operated, the inlet valve 5 is blocked, and the heat storage valve 21 is opened. Such operations may be automatically performed by the controller 30 as described above.

By opening the heat storage valve 21, a working fluid flows into the steam condenser 2 and not to the turbine 1 by passing heat storage valve 21, the heat storage device 22, and the discharge valve 23 along the branch pipe 24.

Since the fluid flowing into the steam condenser 2 become a vapour that is in a compressed and heated state by the compression pump 3 and the heater, an operational malfunction of the steam condenser 2 may occur by exceeding a condensable range when more than a predetermined amount of the fluid flows into the steam condenser 2.

Accordingly, a temperature and a pressure of the working fluid should be decreased before reaching an amount of compressed heated fluid that can flow to the steam condenser 2.

However, in the above case, energy loss may occur when heat of the working fluid is discharged as wasted heat. Accordingly, by supplying heat generated by discharging the working fluid to the heat consuming facility 40 that needs heat, the whole energy efficiency increases by recycling the wasted heat.

There are various heat consuming facilities 40. In particular, there is heat demand in various industrial facilities such as drying furnaces, heating furnaces, hot water tanks, hot wells, etc. that are constantly operated even in the summer. There is a heat demand not only in industrial facilities but also in agricultural facilities since there is a huge demand for heat in agricultural facilities such as vinyl greenhouses, barns, warehouses, etc. in the spring, autumn and winter.

Accordingly, heat discharged by the heat storage device 22 may be recycled by storing the heat in a form of a hot water tank (not shown) for the heat consuming facility 40, or by directly supplying the heat to the heat consuming facility 40.

Meanwhile, when the heat storage device 22 discharges heat to the outside while a pressure of the working fluid is decreased by the discharge valve 23 and the working fluid is transferred to the steam condenser 2, the steam condenser 2 receiving the working fluid may liquefy the working fluid more easily, thus a load applied to the steam condenser 2 may be further reduced.

Accordingly, a repair of the malfunctioned device may be performed without stopping an operation of the turbine power generation system by discharging the heat of the heat storage device 22 for recycling and by reducing the pressure performed by the discharge valve 23. In the above processes, unnecessary energy loss may be minimized.

As described above, when the turbine power generation system stops operating due to a device malfunction, a boiler for the heater 4 is cooled down since the boiler also stops operating when the turbine power generation system stops operating, considerable energy and time are required for the boiler to reach a normal operation temperature when the turbine power generation system re-starts to operating and the boiler also re-starts operating after the device has been repaired.

When the boiler reaches a temperature that is needed for a normal operation of the turbine power generation system, energy required to maintain the temperature is relatively low, but it takes a lot of energy to operate the boiler until it reaches a target temperature, and the operating time of the boiler until the target temperature is reached is considerably long. Accordingly, the emergency discharge part 20 becomes the means that reduces a heat load applied to the steam condenser 2 and minimizes wasted energy while operating and without stopping the turbine power generation system.

FIG. 7 shows the emergency operation method of the turbine power generation system of the present invention in a block diagram form.

Herein, a description of the emergency operation method is omitted since all of the emergency operation method is included in the above description.

Although a preferred embodiment of the present invention has been described for illustrative purposes, those skilled in the art will appreciate that various modifications, additions and substitutions are possible, without departing from the scope and spirit of the invention as disclosed in the accompanying claims.

DESCRIPTION OF THE REFERENCE NUMERALS IN THE DRAWINGS

1: turbine 2: steam condenser
3: compression pump 4: heater
5: inlet valve 6: proportional control valve
7: power generator 8: synchronizer
9: speed governor 10: inlet sensor part
20: emergency discharge part 21: heat storage valve
22: heat storage device 23: discharge valve
24: branch pipe 30: controller
31: control module 31-1,2,3,4: signal transmission line
40: heat consuming facility

What is claimed is:

1. A turbine power generation system having an emergency operation means, wherein the system includes: a steam turbine; a steam condenser; a compression pump; a heater; an inlet valve; and a proportional control valve which are sequentially connected to each other and form a closed loop, with a synchronizer and a speed governor which enable an amount of a working fluid that flows through the closed loop, to be controlled by the inlet valve and the proportional control valve according to a number of revolutions per hour of the steam turbine, the system comprising:

an inlet sensor part including a thermometer, a pressure gauge, and a flowmeter that are installed between the heater and the inlet valve and;

an emergency discharge part including a branch pipe connected to the steam condenser by being branched from one point between the inlet sensor part and the inlet valve, and a heat control means installed on the branch pipe.

2. The system of claim 1, wherein the heat control means is configured with a heat storage valve, a heat storage device, and a discharge valve that are installed on the branch pipe sequentially from the one point.

3. The system of claim 2, wherein the heat storage device is configured with a heat exchanger, and a heat amount exchanged in the heat storage device is transferred to a heat consuming facility.

4. The system of claim 3, further comprising: a controller receiving signals indicative of sensing results from the inlet sensor part in real time, and controlling the heat storage valve and the discharge valve, and issuing a control command to the synchronizer to control the inlet valve.

5. An emergency operation method of operating a turbine power generation system, wherein the turbine power generation system includes: a steam turbine; a steam condenser; a compression pump; a heater; an inlet valve; and a proportional control valve which are sequentially connected to each other and form a closed loop, with a synchronizer; and a speed governor which enable an amount of a working fluid that flows through the closed loop, to be controlled by the inlet valve and the proportional control valve according to revolutions per hour of the steam turbine, and the system includes: an inlet sensor part including a thermometer, a pressure gauge, and a flowmeter that are installed between the heater and the inlet valve and; and an emergency discharge part including a branch pipe connected to the steam condenser by being branched from one point between the inlet sensor part and the inlet valve, and a heat control means installed in the branch pipe, the method comprising:
  a first step of checking temperature, pressure, and flow rate measurement values of the inlet sensor part of the system in real time;
  a second step of blocking the inlet valve and the proportional control valve until a device malfunction being removed, and bypassing the working fluid to the branch pipe when the measurement values exceed threshold values; and
  a third step of opening the inlet valve and the proportional control valve, and blocking the branch pipe when the device malfunction is removed.

6. The method of claim 5, wherein the heat control means is configured with a heat storage valve, a heat storage device, and a discharge valve that are installed on the branch pipe sequentially from the one point.

7. The method of claim 6, wherein the heat storage device is configured with a heat exchanger, and a heat amount exchanged in the heat storage device is transferred to a heat consuming facility.

8. The method of claim 7, wherein the turbine power generation system further includes: a controller receiving signals indicative of sensing results from the inlet sensor part in real time, and controlling the heat storage valve and the discharge valve, and issuing a control command to the synchronizer to control the inlet valve.

\* \* \* \* \*